O. F. PETERSEN.
VACUUM CONDUIT SYSTEM.
APPLICATION FILED MAR. 18, 1912.
1,054,027. Patented Feb. 25, 1913.
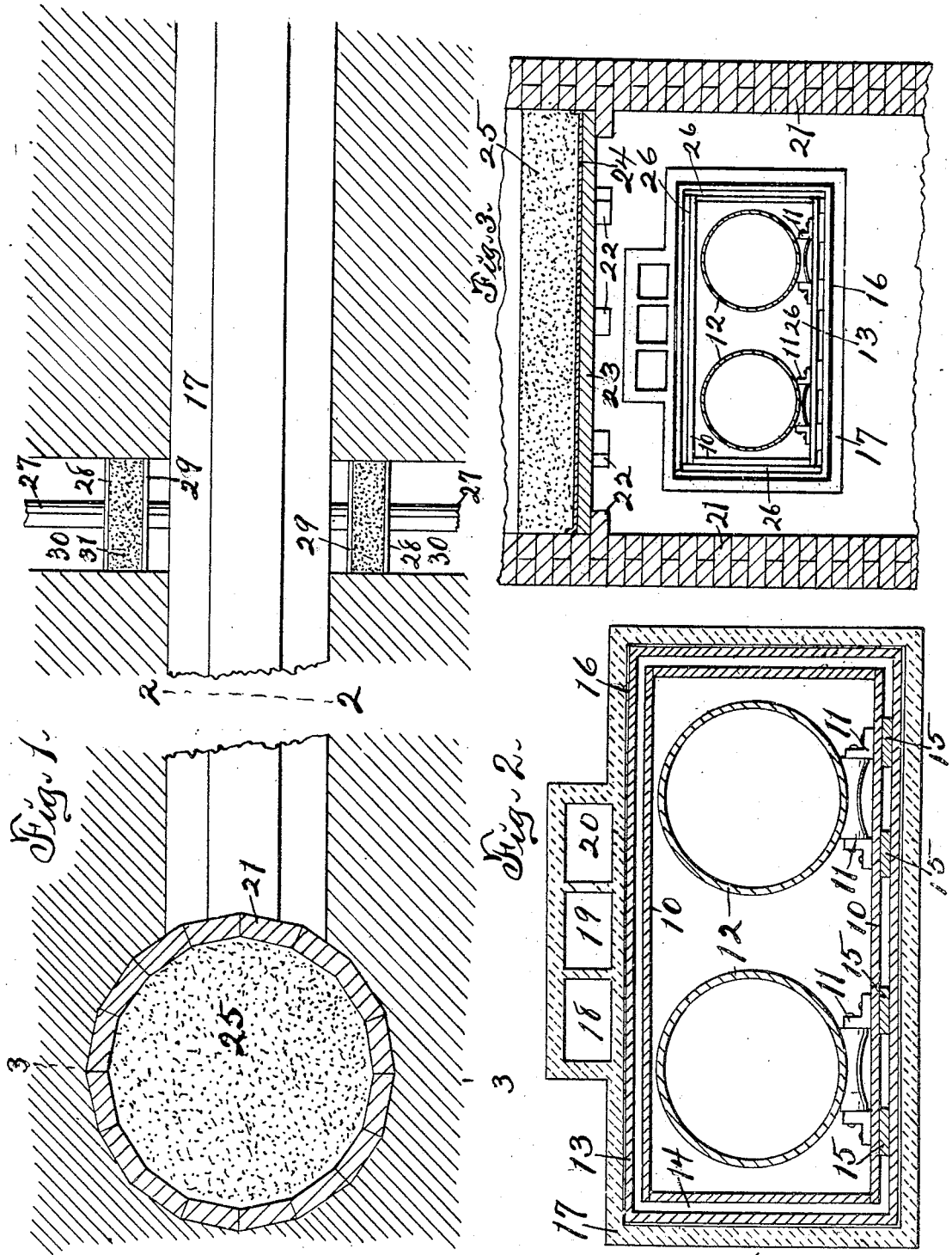

UNITED STATES PATENT OFFICE.

OSCAR F. PETERSEN, OF DES MOINES, IOWA.

VACUUM-CONDUIT SYSTEM.

1,054,027.  Specification of Letters Patent.  Patented Feb. 25, 1913.

Application filed March 18, 1912. Serial No. 684,415.

*To all whom it may concern:*

Be it known that I, OSCAR F. PETERSEN, citizen of the United States of America, and resident of Des Moines, Polk county, Iowa, have invented a new and useful Vacuum-Conduit System, of which the following is a specification.

The object of this invention is to provide an improved construction for conduit systems.

A further object of this invention is to provide means for sealing a conduit system in order that a partial vacuum may be created therein for the purpose of minimizing the conductivity with respect to heat.

A further object of this invention is to provide improved means for sealing laterals relative to the mains of a conduit system.

A further object of this invention is to provide means for sealing man-holes of a conduit system.

My invention consists primarily in the production of a partial vacuum in a conduit system.

My invention consists further in the construction incident to the production of a partial vacuum in a conduit system.

My invention consists further in the construction, arrangement and combination of elements hereinafter set forth, pointed out in my claims and illustrated by the accompanying drawing, in which—

Figure 1 is a plan, partly in section, illustrating my improved construction. Fig. 2 is a cross-section of a preferred form of my improved conduit on the indicated line 2—2 of Fig. 1 and enlarged relative thereto. Fig. 3 is a cross-section through a preferred form of man-hole of my improved construction, on the indicated line 3—3 of Fig. 1 and enlarged relative thereto. In Fig. 1 I have shown open ditches containing the main and laterals and a man-hole in horizontal section.

In the construction of the device as shown the numeral 10 designates an inner conduit, preferably made of wood and adapted to contain and support roller stands 11 on which pipes 12 are carried. The pipes 12 may be used for conveying any fluids, such as steam, hot air, hot or cold water, gas for illuminating or fuel purposes, oil, beer, refrigerating liquids or gases and the like, and are wholly spaced from the inner surfaces of the inner conduit 10. I prefer to employ roller stands 11 for supporting the pipes 12 as they do not hinder expansion or contraction of the pipes longitudinally under changes of temperature. A casing 13, preferably made of wood, surrounds, entirely incloses and is spaced from the inner conduit 10 and forms an air chamber 14 between them, which air chamber is unbroken except for blocks or stringers 15, preferably made of wood, which blocks or stringers are mounted between the bottom of the inner conduit and the bottom of the casing beneath the roller stands 11. A lining 16 of any suitable material such as asbestos, tar paper, felt, burlap, or the like, surrounds, incloses and contacts with the outer surface of the casing 13 and may be secured thereto in any conventional way. A jacket 17 of concrete surrounds, incloses and contacts with the outer surface of the lining 16. The jacket 17 is formed with superposed longitudinal conduits of any size and in any desired number such as are indicated by the numerals 18, 19, 20 in Figs. 2 and 3, which conduits may be employed to contain electric, telegraph or telephone wires, speaking tubes, pneumatic tubes and the like. Each end portion of the conduit main built up as described extends through and is built into the wall 21 of a man-hole, the man-holes occurring at stated intervals through the length of the main. Projections 22 extend inwardly from the wall 21 of the man-hole and a closing plate 23, preferably of wood, loosely overlies said projections and is covered by lining 24 of asbestos, paper, felt, burlap or the like. A bed of sand 25 is placed on the lining 24 and together with said lining and closing plate effectively seals the lower portion of the man-hole which is in communication with the inner conduit 10. End portions of the air chamber 14 adjacent the man-holes preferably are closed by cleats 26 so as to cut off communication between said air chamber and the man-hole. The pipes 12 may extend across the man-hole from one conduit 10 to another. Any contents of the superposed conduits 18, 19, 20 may extend across the man-hole or be connected to apparatus in the man-hole such as meters, transformers and the like (not shown). Lateral pipes 27, such as service pipes, may communicate with the pipes 12 and extend laterally through the conduit 10, air chamber 14, casing 13, lining 16 and jacket 17 to any desired points. These lateral pipes 27 or service pipes may be contained in lesser conduits identical with the main conduit above described, but I have illustrated them in Fig. 1 as not so contained but extending through the earth only and in contact therewith. It is desirable to seal the exit of the lateral pipes from the main conduit and to that end I have provided spaced gates 28, 29 in the lateral ditches 30 and a filling of sand 31 between said gates, the filling of sand surrounding the lateral pipes and preferably inclosing and concealing joints whereby the service pipes are attached to the taps from the main pipes.

In the practical use of the conduit and man-holes as illustrated and above described, a partial vacuum is created by pumping out a portion of the air in the inner conduit 10 and in the lower portion of the man-holes. Such partial vacuum minimizes conductivity and maintains and conserves desired temperature of the contents of the pipes 12. This conservation is of great advantage in conveying steam, hot air, hot water, beer, or refrigerating materials through the pipes 12 in that it provides for the delivery of the fluids at a temperature differing little if any from that at which the fluids are introduced to the main pipes. The use of partial vacuum in the manner described is of great advantage in that it eliminates the necessity of insulating the pipes 12 by any of the expensive and cumbersome methods commonly used, such as by superposed wooden jackets separated by alternate air spaces and composition linings, and it also permits unrestricted expansion and contraction of the iron pipes without damage to the insulating means.

I do not desire to be understood as limiting myself to the precise construction illustrated and described herein as such construction may be modified in many particulars and to large degree without departing from the primary object of my invention.

I claim as my invention—

1. A conduit system constructed for the creation of a partial vacuum and comprising an inner conduit, a casing surrounding and spaced from the inner conduit, a lining surrounding said casing, a jacket surrounding said lining, a manhole intersecting said conduit, casing, lining and jacket, and a main pipe in said inner conduit extending across said manhole, the spaces between the conduit and casing being sealed and the mouth of the manhole being sealed.

2. A conduit system adapted to be buried in the earth, comprising spaced conduits, a manhole intersecting said conduits, a main pipe in the inner conduit extending across said manhole, and means permitting a partial vacuum around said pipe, which means consists of devices for transversely closing and sealing against air passage the space between the conduits and the entrance to the manhole.

3. A conduit system, comprising an inner conduit, a casing surrounding and spaced from the inner conduit, a lining surrounding said casing, a jacket surrounding said lining, a sealed manhole intersecting said conduits, and a main pipe in said inner conduit extending across said manhole.

4. A conduit system, comprising an inner conduit, a casing surrounding and spaced from the inner conduit, means for closing end portions of the space between the inner conduit and casing, a lining surrounding said casing, a jacket surrounding said lining, and a main pipe in said inner conduit.

5. A conduit system, comprising an inner conduit, a casing surrounding and spaced from the inner conduit, a lining surrounding said casing, a jacket surrounding said lining, a main pipe in the inner conduit and superposed conduits built into said jacket.

6. A conduit system, comprising an inner conduit, a casing surrounding and spaced from the inner conduit, a lining surrounding said casing, a jacket surrounding said lining, a man-hole communicating with the inner conduit, a closing plate removably and replaceably mounted transversely of said man-hole, a lining on said closing plate, and a sand bed on said lining.

7. A conduit system, comprising an inner conduit, a casing surrounding and spaced from said inner conduit, means for closing end portions of the space between the inner conduit and casing, a lining surrounding said casing, a jacket surrounding said lining, a man-hole communicating with the inner conduit, a closing plate removably and replaceably mounted transversely of said man-hole, a lining on said closing plate, and a sand bed on said lining.

8. A conduit system, comprising an inner conduit, a casing surrounding and spaced from the inner conduit, a lining surrounding said casing, a jacket surrounding said lining, superposed conduits built into said jacket, a man-hole communicating with the inner conduit, a closing plate removably and replaceably mounted transversely of said man-hole, a lining on said closing plate, and a sand bed on said lining.

9. A conduit system, comprising an inner conduit, a casing surrounding and spaced from the inner conduit, a lining surrounding said casing, a jacket surrounding said lining, a main pipe in the inner conduit, a lateral pipe leading from the main pipe through one wall of the main conduit, spaced gates surrounding said lateral pipe, and a sand seal between said spaced gates.

10. A conduit system, comprising an inner conduit, a casing surrounding and spaced from the inner conduit, means for closing end portions of the space between the inner conduit and casing, a lining surrounding said casing, a jacket surrounding said lining, a main pipe in the inner conduit, a lateral pipe leading from the main pipe through one wall of the main conduit, spaced gates surrounding said lateral pipe, and a sand seal between said spaced gates.

11. A conduit system, comprising an inner conduit, a casing surrounding and spaced from the inner conduit, a lining surrounding said casing, a jacket surrounding said lining, superposed conduits built into said jacket, a main pipe in the inner conduit, a lateral pipe leading from the main pipe through one wall of the main conduit, spaced gates surrounding said lateral pipe, and a sand seal between said spaced gates.

Signed by me at Des Moines, Iowa, this 18th day of March, 1911.

OSCAR F. PETERSEN.

Witnesses:
 S. C. SWEET,
 EARL M. SINCLAIR.